(12) United States Patent
Choi

(10) Patent No.: US 10,869,533 B2
(45) Date of Patent: Dec. 22, 2020

(54) APPLICATOR HAVING IMPROVED CONTENTS TRANSFER ABILITY

(71) Applicant: AMOREPACIFIC CORPORATION, Seoul (KR)

(72) Inventor: Jung Sun Choi, Yongin-si (KR)

(73) Assignee: AMOREPACIFIC CORPORATION, Seoul (KR)

(*) Notice: Subject to any disclaimer, the term of this patent is extended or adjusted under 35 U.S.C. 154(b) by 185 days.

(21) Appl. No.: 15/570,150

(22) PCT Filed: Apr. 22, 2016

(86) PCT No.: PCT/KR2016/004221
§ 371 (c)(1),
(2) Date: Oct. 27, 2017

(87) PCT Pub. No.: WO2016/175508
PCT Pub. Date: Nov. 3, 2016

(65) Prior Publication Data
US 2018/0116370 A1 May 3, 2018

(30) Foreign Application Priority Data
Apr. 30, 2015 (KR) .................. 10-2015-0062090

(51) Int. Cl.
| A45D 37/00 | (2006.01) |
| A45D 34/04 | (2006.01) |
| A45D 33/34 | (2006.01) |
| A45D 40/26 | (2006.01) |
| B32B 5/18 | (2006.01) |
| A45D 33/36 | (2006.01) |

(52) U.S. Cl.
CPC .............. *A45D 37/00* (2013.01); *A45D 33/34* (2013.01); *A45D 34/04* (2013.01); *A45D 34/042* (2013.01); *A45D 40/262* (2013.01); *B32B 5/18* (2013.01); *A45D 33/36* (2013.01); *A45D 2200/1009* (2013.01); *A45D 2200/1018* (2013.01); *B32B 2266/0278* (2013.01); *B32B 2266/104* (2016.11)

(58) Field of Classification Search
CPC ............... B32B 5/18; B32B 2266/104; B32B 2266/0278; A45D 34/04; A45D 34/042; A45D 37/00; A45D 40/262; A45D 33/34; A45D 2200/1009; A45D 33/36; A45D 2200/1018
See application file for complete search history.

(56) References Cited

U.S. PATENT DOCUMENTS

| 3,949,137 | A | 4/1976 | Akrongold et al. |
| 7,416,358 | B2 | 8/2008 | Legendre |
| 7,611,301 | B2 | 11/2009 | Gueret |
| 7,704,437 | B2 | 4/2010 | Yamato et al. |
| 9,498,043 | B2 | 11/2016 | Nishimura et al. |
| 10,085,540 | B2 * | 10/2018 | Choi ................ A45D 33/34 |
| 10,092,498 | B2 * | 10/2018 | Choi ................ A61K 8/06 |
| 10,105,291 | B2 * | 10/2018 | Jung ................ A61K 8/8123 |
| 2002/0019450 | A1 | 2/2002 | Fukuzawa et al. |
| 2009/0214621 | A1 | 8/2009 | Dupont et al. |
| 2013/0002523 | A1 | 1/2013 | Alston-Hughes |
| 2014/0023689 | A1* | 1/2014 | Kim ................ A61K 8/87 424/401 |
| 2014/0154295 | A1 | 6/2014 | Sim et al. |
| 2014/0341959 | A1 | 11/2014 | Choi et al. |
| 2015/0078802 | A1 | 3/2015 | Choi et al. |

FOREIGN PATENT DOCUMENTS

| CN | 1525925 A | 9/2004 |
| CN | 104039196 A | 9/2014 |
| CN | 104349695 A | 2/2015 |
| CN | 104363789 A | 2/2015 |
| CN | 104379021 A | 2/2015 |
| JP | S55130608 U | 9/1980 |
| JP | H0255816 U | 4/1990 |
| JP | H0444813 U | 4/1992 |
| JP | 2005312798 A | 11/2005 |
| JP | 2007330771 A | 12/2007 |
| KR | 1020080025380 A | 3/2008 |
| KR | 1020130116044 A | 10/2013 |
| WO | 2013002523 A2 | 1/2013 |
| WO | 2015042538 A1 | 3/2015 |

OTHER PUBLICATIONS https://www.bettersizeinstruments.com/the-relationship-between-mesh-and-micron-m.html 2019.*
International Search report for PCT/KR2016/004221, dated Jul. 29, 2016 (4 pages with translation).
Taiwanese Office Action dated Jul. 3, 2019, 11 pages.
Extended European Search Report dated Oct. 29, 2018, 4 pp.
Japanese Office Action dated Feb. 14, 2020 of Japanese Patent Application No. 2017-556535.

* cited by examiner

*Primary Examiner* — Blessing M Fubara
(74) *Attorney, Agent, or Firm* — Cantor Colburn LLP

(57) ABSTRACT

The present invention relates to a cosmetic composition applicator comprising a urethane foam obtained by foaming a polyurethane, wherein the urethane foam has a structure comprising a membrane structure and a net structure. According to the present invention, the cosmetic composition applicator has improved transfer ability due to the simple absorption and discharge of a cosmetic composition and, simultaneously, can smoothly apply a cosmetic composition to the skin without caking.

15 Claims, No Drawings

APPLICATOR HAVING IMPROVED CONTENTS TRANSFER ABILITY

TECHNICAL FIELD

The present disclosure relates to an applicator having improved delivery ability of a cosmetic composition.

BACKGROUND ART

To apply a cosmetic composition to the skin, hands or cosmetic sponges have been used to date. However, as cosmetic compositions have been provided with various types of formulations, it has been required to develop applicators having various properties depending on viscosity, ingredients and uses of the compositions.

It is required for an applicator for use in applying a liquid cosmetic composition to prevent absorption of a liquid cosmetic composition or to allow instantaneous absorption and discharge of a liquid cosmetic composition in order to deliver the composition to the skin. However, when the applicators according to the related art are used to apply a liquid cosmetic composition, there is a problem in that the composition is not discharged with ease after it is absorbed by the applicators, resulting in poor delivery ability.

For example, as applicator, latex-made foam has a large pore size and is loose, and thus provides high covering ability. However, such latex-made foam may not apply a liquid composition smoothly and uniformly to the skin due to the marks of the pores formed in the foam and shows a high absorption ratio of a low-viscosity liquid composition to provide low delivery ability of a cosmetic agent. Therefore, such latex-made foam is not suitable as applicator. When the pores formed in the latex-made foam are processed to have a smaller size, the latex-made foam undergoes degradation of soft texture and may not provide soft and smooth applicability to the skin. Polyurethane-made foam may be controlled to have a small pore size, and thus allows soft and smooth makeup on the skin. However, such polyurethane-made foam may have poor covering ability.

Therefore, there is a need for developing an applicator that may be used for various cosmetic compositions according to customers' needs.

REFERENCE

Patent Document (Patent Document 1) Korean Laid-Open Patent No. 10-2008-0025380

DISCLOSURE

Technical Problem

A technical problem to be solved by the present disclosure is to provide an applicator for a cosmetic composition which has improved delivery ability of a cosmetic composition and allows smooth application of a cosmetic composition to the skin without agglomeration.

Technical Solution

In one general aspect, there is provided an applicator for a cosmetic composition including urethane foam having a structure including a membrane structure and a net structure.

In another general aspect, there is provided a cosmetic product, including the above-mentioned applicator for a cosmetic composition, and a cosmetic composition.

Advantageous Effects

In general, it is preferred for a foam-type applicator to have a smaller pore size in order to apply a cosmetic composition well with the applicator without smearing or agglomeration. However, an applicator including foam having an excessively small pore size has poor delivery ability, and thus shows a low skin makeup effect.

The applicator for a cosmetic composition according to the present disclosure has a structure including a membrane structure and a net structure, and thus has improved delivery ability of a cosmetic composition, allows easy and adequate discharge of a cosmetic composition and applies a cosmetic composition uniformly and softly to the skin without agglomeration or smearing. Therefore, the applicator for a cosmetic composition according to the present disclosure has excellent delivery ability and applicability of a cosmetic composition to the skin.

BEST MODE

As used herein, the term 'applicator' means an instrument for use in delivering any material or ingredient to the skin, and is used in its broadest meaning covering all types of applicators such as a puff, tip, brush, and the like.

As used herein, the term 'foam' means a foamed and solidified product of polyurethane, rubber, vinyl, or the like.

As used herein, the term 'applicability' means property of applying any material or composition softly and uniformly to the skin, or the like.

As used herein, the term 'absorbability' or 'absorption ability' means taking any material or ingredient temporarily up to an applicator or the like, and absorption of an adequate amount of material or ingredient is preferred, no more and no less than that.

As used herein, the term 'dischargeability' or 'discharge ability' means an amount of any material or ingredient taken up by an applicator to a target for delivery, such as the skin, and discharge of an adequate amount of material or ingredient is preferred, no more and no less than that.

As used herein, the term 'delivery capability' or 'delivery ability' means effective delivery of any material or ingredient taken up by an applicator to a target for application. It may be evaluated in terms of a delivery ratio of the material or ingredient to the skin and may be calculated according to the following formula:

Delivery ratio (%)=(amount of cosmetic composition taken up by applicator to target for application (discharged amount)/amount of cosmetic composition absorbed by applicator (absorbed amount))×100

As used herein, the term 'carrier' means one capable of supporting (i.e., receiving and retaining) any material or ingredient, such as a composition, and may also be referred to as 'support', 'impregnation base' or 'medium'. In addition, 'carrier' may be used to discharge the material supported thereon to a separate applicator.

As used herein, the term 'Asker F hardness' means hardness measured by Asker Durometer Type F before a composition is absorbed by an applicator.

Hereinafter, the present disclosure will be explained in more detail.

In one aspect, there is provided an applicator for a cosmetic composition including urethane foam.

According to an embodiment, the urethane foam is obtained by foaming to and solidifying polyurethane and includes a large number of pores. The urethane foam may also be referred to as 'foamed urethane'.

According to another embodiment, the applicator for a cosmetic composition may include urethane foam in an amount of at least 80 wt %, at least 85 wt %, at least 90 wt %, at least 93 wt %, at least 95 wt %, at least 97 wt %, at least 98 wt %, at least 99 wt % or 100 wt %, but is not limited thereto.

According to still another embodiment, the urethane foam may be one formed by foaming at least one of polyether-based polyurethane, polyester-based polyurethane and polycarbonate-based polyurethane. In other words, the urethane foam may include at least one type of foam selected from polyether-based polyurethane, polyester-based polyurethane and polycarbonate-based polyurethane. More particularly, the urethane foam may be one formed by foaming polyether-based polyurethane, i.e., polyether-based polyurethane foam. The urethane foam formed by foaming polyether-based polyurethane shows a soft feel of use when it is in contact with the skin.

According to still another embodiment, the pores contained in the urethane foam may have an average pore size of 70 μm-300 μm.

Herein, 'pore size' means the average diameter of pores contained in urethane foam. When the average pore size is less than 70 μm, it is difficult to absorb and discharge a liquid cosmetic composition, and thus the applicator is not suitable for application of a liquid cosmetic composition. When the average pore size is larger than 300 μm, the applicator shows a rough feel of use and it is difficult for the applicator to provide a smooth skin makeup effect without agglomeration. The pore size may be determined by using an optical microscope (Nikon ECLIPSE LV100POL) at a magnification ratio of 5×/0.15.

According to still another embodiment, the urethane foam may include pores in a number of pores per inch (ppi) of 5-500 per inch of urethane foam. Particularly, the pore number may be at least 5, at least 10, at least 50, at least 100, at least 200, at least 300, at least 400 or at least 500 ppi and at most 500, at most 400, at most 300, at most 200, at most 100, at most 50, at most 10 or 5 ppi. As used herein, 'pore umber' means a pore number per inch of sponge and may be an average of pore numbers measured precisely on the line of 1 inch of width and 1 inch of length.

According to still another embodiment, the urethane foam may have a structure including a membrane structure and a net structure.

As used herein, the term 'membrane structure' means a structure in which micropores are separated from each other by a membrane defining each pore. As used herein, the term 'net structure' means a structure which includes micropores connected to each other and has a net-like loose structure.

According to still another embodiment, the urethane foam having such a membrane structure may have an average pore size of 70 μm-150 μm. In the membrane structure, the pores of the urethane foam are separated from each other by a membrane and have a micro-scaled size to allow dispersive absorption and discharge of contents, such as a cosmetic composition. Such micropores allow slow absorption and discharge of contents. Particularly, The micropores contained in the membrane structure may have an average size of at least 70 μm, at least 80 μm, at least 90 μm, at least 100 μm, at least 110 μm, at least 120 μm, at least 130 μm, at least 140 μm or at least 150 μm and at most 150 μm, at most 140 μm, at most 130 μm, at most 120 μm, at most 110 μm, at most 100 μm, at most 90 μm, at most 80 μm or at most 70 μm. When the micropores have an average size less than 70 μm, it is not possible to absorb and discharge a cosmetic composition smoothly. When the micropores have an average size larger than 150 μm, it is difficult to provide a smooth skin makeup effect, since the urethane foam shows a rough skin makeup effect when applying a cosmetic composition to the skin by using the same.

According to still another embodiment, the urethane foam having the net structure may have an average pore size of 100 μm-300 μm. In the net structure, the pores of the urethane foam are formed loosely like a net. The net structure is characterized by faster absorption and discharge of contents, such as a cosmetic composition, as compared to the membrane structure. By virtue of the net structure, it is possible to absorb and discharge a large amount of cosmetic composition smoothly. Particularly, the pores contained in the net structure may have a size of at least 100 μm, at least 150 μm, at least 200 μm or at least 300 μm and at most 300 μm, at most 200 μm or at most 100 μm. When the pores have an average size less than 100 μm, the urethane foam shows poor dischargeability and thus provides low delivery ability of a cosmetic composition. When the pores have an average size larger than 300 μm, the urethane foam shows a rough feel on the skin and it is difficult to carry out uniform application.

According to still another embodiment, the applicator may have both the membrane structure and the net structure. The membrane structure and the net structure may have a longitudinally or transversely stacked structure, or may be distributed randomly in foam without interlayer separation, but are not limited thereto.

According to still another embodiment, the applicator having both the membrane structure and the net structure allows easy absorption and discharge of a cosmetic composition. Thus, it is possible to control the amount of a composition to be applied to the skin and to apply a composition uniformly without smearing on the skin.

For example, the urethane foam may include the membrane structure and the net structure at an area ratio of 9:1-3:7 on one sectional surface of the urethane foam. More particularly, the membrane structure may be present at an area ratio of at most 90%, at most 80%, at most 70%, at most 60%, at most 50%, at most 40%, at most 30%, at most 20% or 10% based on the total area, while the net structure may be present at an area ratio of at least 10%, at least 20%, at least 30%, at least 40%, at least 50%, at least 60%, at least 70%, at least 80% or 90% based on the total area, but is not limited thereto. The ratio may be controlled depending on physical properties, such as viscosity and formulation, of the composition to be applied.

When the membrane structure is present at a ratio larger than 90%, a cosmetic composition may be absorbed and discharged too slowly, and thus an excessively small amount of cosmetic composition may be delivered to the skin. For example, when the cosmetic composition is foundation, an excessively small amount of composition may be delivered to the skin, resulting in poor covering ability. In addition, when the membrane structure is present at a ratio less than 50%, the ratio of the net structure is increased relatively to provide a loose structure on the whole, thereby making it difficult to apply a cosmetic composition uniformly to the skin, and providing a rough feel of touch that may cause skin irritation.

According to still another embodiment, the applicator for a cosmetic composition has a cosmetic composition delivery ratio that may be calculated according to the following Mathematical Formula 1:

Delivery ratio (%)=(amount of cosmetic composition taken up by applicator to target for application (discharged amount)/amount of cosmetic composition absorbed by applicator (absorbed amount))×100     [Mathematical Formula 1]

The discharged amount means the amount of a cosmetic composition taken up by an applicator to a target for application, while the absorbed amount means the amount of a cosmetic composition taken up temporarily by an applicator.

The delivery ratio is most proper when an adequate amount of cosmetic composition is absorbed and discharged no more than that and no less than that. The applicator for a cosmetic composition according to an embodiment may have a cosmetic composition delivery ratio of 30%-100%. More particularly, the applicator for a cosmetic composition according to an embodiment may have a delivery ratio of at least 30%, at least 35%, at least 40%, at least 50%, at least 60%, at least 70%, at least 80%, at least 90% or 100% and at most 100%, at most 90%, at most 80%, at most 70%, at most 60%, at most 40% or 30%.

According to still another embodiment, the urethane foam may have a multi-layered structure. For example, the multi-layered structure may include a plurality of urethane foam layers having a different pore size or a plurality of urethane foam layers made of a different material. In a variant, the multi-layered structure may include a membrane-structured layer and a net structured layer, wherein the layer that is in contact with the skin may have a membrane structure or a net structure.

According to still another embodiment, the applicator for a cosmetic composition may be provided with at least one of a curved surface and a flat surface. Herein, an applicator for a cosmetic composition provided with a curved surface and a flat surface at the same time means that the applicator has a part of a spherical body and a part of a planar body at the same time. The applicator provided with at least one of a curved surface and a flat surface may have at least one shape selected from the group consisting of a semi-spherical shape, semi-oval shape, bell-like shape, disk-like shape, cylindrical shape, star column shape, prism-like shape, square column shape, hexahedral shape, tetrahedral shape and a pyramidal shape, but is not limited thereto.

According to still another embodiment, the applicator for a cosmetic composition may have a Type F Asker hardness of 30-80 as determined by using Type F Asker Durometer. When the applicator for a cosmetic composition has a hardness less than 30, it shows poor close contactability. When the applicator has a hardness larger than 80, it is too hard to provide a sufficient soft feel around the skin. Particularly, the applicator for a cosmetic composition may have an Asker F hardness of at most 80, at most 70, at most 60, at most 50, at most 40 or 30 and at least 30, at least 40, at least 50, at least 60, at least 70 or 80.

According to still another embodiment, the applicator for a cosmetic composition may have a thickness of 0.05 mm-8 mm. When the applicator has a thickness less than 0.05 mm, it is not easy to absorb and discharge a cosmetic composition, thereby providing a limited skin makeup effect. When the applicator has a thickness larger than 8 mm, it is difficult to subject the urethane foam including a cosmetic composition to an additional lamination or hot sealing process. Particularly, the applicator for a cosmetic composition may have a thickness of at most 8 mm, at most 7 mm, at most 6 mm, at most 5 mm, at most 4 mm, at most 3 mm, at most 2 mm, at most 1 mm, at most 0.5 mm or at most 0.1 mm, and at least 0.05 mm, at least 0.1 mm, at least 0.5 mm, at least 1 mm, at least 2 mm, at least 3 mm, at least 4 mm, at least 5 mm, at least 6 mm, at least 7 mm or 8 mm.

According to still another embodiment, it is possible to control degrees of absorption and discharge of a cosmetic composition by adjusting the density of the applicator for a cosmetic composition. The applicator may have a density of 0.05-0.2 g/cm$^3$ (3.12-12.48 lb/ft$^3$), particularly 0.1-0.18 g/cm$^3$. When the applicator for a cosmetic composition has a density less than 0.05 g/cm$^3$, it may have low durability. When the applicator has a density larger than 0.2 g/cm$^3$, it is difficult to discharge and absorb a cosmetic composition smoothly and the applicator may be degraded in terms of a soft feel of use. Herein, the density may be determined by the method according to ASTM D3574.

According to still another embodiment, there is provided an applicator for a cosmetic composition which further includes foam formed by foaming at least one selected from acrylonitrile butadiene rubber (NBR), styrene-butadiene rubber (SBR), natural rubber (NR), polyvinyl chloride, polyethylene, ethylene-vinyl acetate rubber (EVA), latex, silicone, styrene-isoprene-styrene (SIS), styrene-ethylene-butylene-styrene (SEBS), polyvinyl alcohol (PVA), nitrile rubber, butyl rubber, chloroprene rubber, polyolefin, ether-based polyurethane, ester-based polyurethane, ethylene-based polyurethane, polyethylene terephthalate and polylactic acid, in combination with the urethane foam. In other words, there is provided an applicator for a cosmetic composition which further includes at least one type of foam selected from acrylonitrile butadiene rubber (NBR), styrene-butadiene rubber (SBR), natural rubber (NR), polyvinyl chloride, polyethylene, ethylene-vinyl acetate rubber (EVA), latex, silicone, styrene-isoprene-styrene (SIS), styrene-ethylene-butylene-styrene (SEBS), polyvinyl alcohol (PVA), nitrile rubber, butyl rubber, chloroprene rubber, polyolefin, ether-based polyurethane, ester-based polyurethane, ethylene-based polyurethane, polyethylene terephthalate and polylactic acid, in combination with the urethane foam.

According to still another embodiment, the applicator for a cosmetic composition may further include a polyurethane film layer on at least one surface of the urethane foam. Particularly, the applicator for a cosmetic composition may form a puff structure through lamination of dry urethane foam with a polyurethane foam. The dry urethane foam forms a cushion layer and the polyurethane film layer is laminated with a portion other than the surface that is in contact with the skin. The puff structure may be integrated by carrying out lamination with a binder and sealing under application of pressure through a hot press or the like.

According to yet another embodiment, the applicator for a cosmetic composition may further include a string, loop or grip fixed thereto. Particularly, the string, loop or grip may be attached to the polyurethane film laminated with one surface of the urethane foam.

In another aspect, there is provided a cosmetic product including the above-described applicator for a cosmetic composition; and a cosmetic composition.

According to an embodiment, the cosmetic composition may be a liquid composition or a solid composition including a viscous solid or powder. Particularly, the cosmetic composition may include a water-in-oil (W/O) type, oil-in-water (O/W) type, oil dispersed, water dispersed or solubilized composition, but is not limited thereto. According to another embodiment, the cosmetic composition may have a formulation selected from solution, emulsion, suspension, paste and jelly, but is not limited thereto.

According to still another embodiment, the cosmetic composition may have a viscosity of 3,000-80,000 centipoise (cps). Herein, the viscosity may be determined by using a viscometer, such as BROOKFIELD RVDV-III ULTRA (Serial No. RY6521152) set to a spindle number 63 and a spindle speed of 5 rpm.

According to still another embodiment, the cosmetic composition may be formulated into makeup primer, makeup base, liquid or solid foundation, concealer, lipstick, lip gloss, powder, lip liner, eye liner, mascara, eyebrow, eye shadow, blusher, twin cake, UV protecting agent, lotion, cream or essence, but is not limited thereto.

According to yet another embodiment, the cosmetic product may further include a carrier for supporting the cosmetic composition. The cosmetic composition may further include a container having a lower part in which the applicator for a cosmetic composition may be received, and a top lid part to which a mirror may be attached (a cosmetic container referred to briefly as 'pact'), but is not limited thereto.

Modes For Invention

Hereinafter, the present disclosure will be described in detail through examples. However, the following examples are for illustrative purposes only and it will be apparent to those of ordinary skill in the art that the scope of the present disclosure is not limited by them.

[Preparation Example] Preparation of W/O Type Emulsion Cosmetic Composition

A W/O type emulsion cosmetic composition is prepared according to the following Table 1 by using the conventional method.

TABLE 1

| | | Ingredients | Amount (wt %) |
|---|---|---|---|
| Oil phase ingredients | Oil ingredient | Ozokerite | 3.00 |
| | Oil ingredient | Dicaprylyl carbonate | 10.00 |
| | Preservative | Methyl paraben | 0.100 |
| | UV protecting agent | Octylmethoxy cinnamate | 7.000 |
| | UV protecting agent | Isoamyl-P-methoxy cinnamate | 2.000 |
| | Pigment | Disteardimonium hectorite | 1.50 |
| | Oil ingredient | Decamethylcyclopentasiloxane | 16.00 |
| | Emulsifier | Sorbitan sesquioleate | 1.000 |
| | Emulsifier | Lauryl PEG.PPG-18.18methicone | 1.500 |
| | Pigment | Polymethyl methacrylate | 5.00 |
| | Pigment | Titanium dioxide/aluminum hydroxide/stearic acid | 7.00 |
| Aqueous phase ingredients | | Water | To 100 |
| | Moisturizer | Glycerin | 8.000 |
| | Emulsion stabilizer | Salt | 1.00 |
| | | Fragrance | 0.400 |
| Total | | | 100.000 |

[Test Example 1] Comparison of Delivery Ability of Cosmetic Composition Depending on Structure of Urethane Foam The applicators having various pore structures according to some embodiments of the present disclosure are determined and evaluated in terms of delivery ability and feel of use (makeup effect) as follows.

Provided are an applicator (Comparative Example 1) including urethane foam having a membrane structure with an Asker F hardness of 55 and an average pore size of 100 μm, an applicator (Comparative Example 2) including urethane foam having a net structure with an Asker F hardness of 55 and an average pore size of 200 μm, an applicator (Example 1) including urethane foam having a membrane structure and a net structure at an area ratio of 2:8 with an Asker F hardness of 58 and an average pore size of 170 μm, an applicator (Example 2) including urethane foam having a membrane structure and a net structure at an area ratio of 9:1 with an Asker F hardness of 56 and an average pore size of 130 μm, and an applicator (Example 3) including urethane foam having a membrane structure and a net structure at an area ratio of 7:3 with an Asker F hardness of 55 and an average pore size of 150 μm. Herein, each applicator has a diameter of 54 mm and a thickness of 7 mm. Then, a string is fixed to each of the applicators according to Comparative Examples 1 and 2 and Examples 1-3 to provide a string-attached puff shape.

After that, the W/O emulsion cosmetic composition obtained from Preparation Example is supported on a carrier, which, in turn, is introduced to a pact container to provide a cosmetic product in the form of a pact.

An absorbed amount is determined by compressing the carrier in which the cosmetic composition is supported under a weight load of 1 kg·f with each of the applicators according to Comparative Examples 1 and 2 and Examples 1-3 to take up the cosmetic composition and measuring the amount of the cosmetic composition taken up by each applicator. A discharged amount is determined by applying each applicator having the cosmetic composition to artificial leather having a size of 3 cm×8 cm under a weight load of 1 kg·f and measuring the amount of the discharged cosmetic composition. A delivery ratio is calculated from the absorbed amount and the discharged amount according to the following formula, and a delivery ratio of 30% or more is evaluated as excellent in delivering a cosmetic composition.

Delivery ratio (%)=(amount of cosmetic composition taken up by applicator to target for application (discharged amount)/amount of cosmetic composition absorbed by applicator (absorbed amount))×100

A feel of use is evaluated from a feel of touch upon the application and a state of the cosmetic composition applied to the artificial leather.

The results of determination and evaluation are shown in the following Table 2.

TABLE 2

Comparison of Absorbability, Dischargeability and
Feel of Use Depending on Structure of Applicator

|  | Comp. Ex. 1 | Comp. Ex. 2 | Ex. 1 | Ex. 2 | Ex. 3 |
|---|---|---|---|---|---|
| Pore structure | Membrane structure | Net structure | Membrane (2) Net (8) | Membrane (9) Net (1) | Membrane (7) Net (3) |
| Absorbed amount (g) | 0.11 | 0.12 | 0.15 | 0.13 | 0.14 |
| Discharged amount (g) | 0.030 | 0.026 | 0.087 | 0.040 | 0.052 |
| Delivery ratio (%) | 27.3 | 21.6 | 58 | 30.7 | 37.1 |
| Delivery ability | X | X | ○ | ○ | ○ |
| Feel of use | Soft and smooth feel of use | Rough surface touch, Non-uniform application | Soft touch | Soft touch, Smooth makeup effect | Soft touch, Smooth makeup effect |

As shown in Table 2, the applicator according to Comparative Example 1 does not have excellent delivery ability and the applicator according to Comparative Example 2 has problems in that it shows poor delivery ability and a rough feel of use on the surface. On the contrary, each of the applicators according to Examples 1-3 shows an adequate absorbed amount and discharged amount, has excellent delivery ability and provides an excellent feel of use.

It can be seen from the above results that the applicator for a cosmetic composition including urethane foam and having a combination of a membrane structure with a net structure according to an embodiment of the present disclosure shows improved absorbability and dischargeability of a cosmetic composition and may have improved delivery ability by adjusting the ratio between the membrane structure and the net structure. At the same time, the applicator for a cosmetic composition according to the present disclosure shows an excellent feel of use.

[Test Example 2] Comparison of Delivery Ability of Cosmetic Composition Depending on Pore Size of Urethane Foam The applicators according to some embodiments of the present disclosure are determined or evaluated in terms of delivery ability and a feel of use (makeup effect) depending on pore size as follows.

Provided are applicators using urethane foam including a membrane structure and a net structure at an area ratio of 7:3 and having an average pore size of 50, 70, 100, 150, 175, 200, 250, 300 and 320 μm according to some embodiments (Examples 4-10 and Comparative Examples 3 and 4). Herein, each applicator has a diameter of 54 mm and a thickness of 7 mm. Then, a string is fixed to each of the applicators according to Examples 4-10 and Comparative Examples 3 and 4 to provide a string-attached puff shape.

After that, the W/O emulsion cosmetic composition obtained from Preparation Example is supported on a carrier, which, in turn, is introduced to a pact container to provide a cosmetic product in the form of a pact.

An absorbed amount is determined by compressing the carrier in which the cosmetic composition is supported under a weight load of 1 kg·f with each of the applicators according to Examples 4-10 and Comparative Examples 3 and 4 to take up the cosmetic composition and measuring the amount of the cosmetic composition taken up by each applicator. A discharged amount is determined by applying each applicator having the cosmetic composition to artificial leather having a size of 3 cm×8 cm under a weight load of 1 kg·f and measuring the amount of the discharged cosmetic composition. A delivery ratio is calculated from the absorbed amount and the discharged amount according to the following formula, and a delivery ratio of 30% or more is evaluated as excellent in delivering a cosmetic composition.

Delivery ratio (%)=(amount of cosmetic composition taken up by applicator to target for application (discharged amount)/amount of cosmetic composition absorbed by applicator (absorbed amount))×100

A feel of use is evaluated from a feel of touch upon the application and a state of the cosmetic composition applied to the artificial leather.

The results of determination and evaluation are shown in the following Table 3.

TABLE 3

Comparison of Absorbability, Dischargeability and Feel
of Use Depending on Average Pore Size of Applicator

|  | Comp. Ex. 3 | Ex. 4 | Ex. 5 | Ex. 6 | Ex. 7 | Ex. 8 | Ex. 9 | Ex. 10 | Comp. Ex. 4 |
|---|---|---|---|---|---|---|---|---|---|
| Average pore size (μm) | 50 | 70 | 100 | 150 | 175 | 200 | 250 | 300 | 320 |
| Absorbed amount (g) | 0.07 | 0.11 | 0.14 | 0.170 | 0.175 | 0.185 | 0.190 | 0.22 | 0.25 |
| Discharged amount (g) | 0.020 | 0.038 | 0.052 | 0.065 | 0.059 | 0.060 | 0.062 | 0.068 | 0.070 |
| Delivery ratio (%) | 28.6% | 34.5% | 37.1% | 38.2% | 33.7% | 32.4% | 32.6% | 30.9% | 28%% |
| Delivery ability | X | ○ | ○ | ○ | ○ | ○ | ○ | ○ | X |

TABLE 3-continued

Comparison of Absorbability, Dischargeability and Feel
of Use Depending on Average Pore Size of Applicator

| | Comp. Ex. 3 | Ex. 4 | Ex. 5 | Ex. 6 | Ex. 7 | Ex. 8 | Ex. 9 | Ex. 10 | Comp. Ex. 4 |
|---|---|---|---|---|---|---|---|---|---|
| Feel of use | Soft and smooth feel of touch | Soft and smooth feel of touch | Soft and smooth feel of touch | Soft and smooth feel of touch | Soft and smooth feel of touch | Soft and smooth feel of touch | Soft and smooth feel of touch | Soft and smooth feel of touch | Rough feel of touch |

As shown in Table 3, each of the applicators according to Examples 4-10 shows an adequate absorbed amount and discharged amount and has excellent delivery ability. On the contrary, Comparative Example 3 shows poor delivery ability and Comparative Example 4 shows poor delivery ability and a rough feel of use, and thus they are not suitable as applicators.

The above results suggest that the applicator for a cosmetic composition including urethane foam and having a combination of a membrane structure with a net structure according to an embodiment of the present disclosure shows improved absorbability and dischargeability of a cosmetic composition and may have further improved delivery ability and feel of use by adjusting the pore size.

The invention claimed is:

1. An applicator for a cosmetic composition, which comprises urethane foam obtained by foaming polyurethane, wherein the urethane foam has a structure comprising a membrane structure and a net structure, and comprises pores having an average pore size of 70-300 µm,
   wherein the urethane foam has a multi-layered structure which comprises a plurality of urethane foam layers having a different pore size or a plurality of urethane foam layers made of a different material, and
   wherein the urethane foam of the membrane structure has an average pore size of 70-150 µm and the urethane foam of the net structure has an average pore size of 100-300 µm.

2. The applicator for a cosmetic composition according to claim 1, wherein the urethane foam is at least one type of foam selected from polyether-based polyurethane, polyester-based polyurethane and polycarbonate-based polyurethane.

3. The applicator for a cosmetic composition according to claim 1, wherein the urethane foam is foam of polyether-based polyurethane.

4. The applicator for a cosmetic composition according to claim 1, wherein the urethane foam comprises the membrane structure and the net structure at an area ratio of 9:1-3:7.

5. The applicator for a cosmetic composition according to claim 1, which has a delivery ratio of a cosmetic composition of 30%-100%, wherein the delivery ratio is calculated by the following Mathematic Formula 1:

Delivery ratio (%)=(amount of cosmetic composition taken up by applicator to target for application (discharged amount)/amount of cosmetic composition absorbed by applicator (absorbed amount))×100.　　[Mathematical Formula 1]

6. The applicator for a cosmetic composition according to claim 1, which has an Asker F hardness of 30-80.

7. The applicator for a cosmetic composition according to claim 1, which has a thickness of 0.05 mm-8 mm.

8. The applicator for a cosmetic composition according to claim 1, which has a density of 0.05-0.2 g/cm$^3$.

9. The applicator for a cosmetic composition according to claim 1, wherein the urethane foam comprises pores and has a pore number per inch (ppi) of 5-500 per inch of the urethane foam.

10. The applicator for a cosmetic composition according to claim 1, which further comprises at least one type of foam selected from acrylonitrile butadiene rubber (NBR), styrene-butadiene rubber (SBR), natural rubber (NR), polyvinyl chloride, polyethylene, ethylene-vinyl acetate rubber (EVA), latex, silicone, styrene-isoprene-styrene (SIS), styrene-ethylene-butylene-styrene (SEBS), polyvinyl alcohol (PVA), nitrile rubber, butyl rubber, chloroprene rubber, polyolefin, ether-based polyurethane, ester-based polyurethane, ethylene-based polyurethane, polyethylene terephthalate and polylactic acid, in combination with the urethane foam.

11. The applicator for a cosmetic composition according to claim 1, which further comprises a polyurethane film layer on at least one surface of the urethane foam.

12. The applicator for a cosmetic composition according to claim 1, which further comprises a string, loop or grip fixed thereto.

13. A cosmetic product comprising:
   the applicator for a cosmetic composition as defined in claim 1; and
   a cosmetic composition.

14. The cosmetic product according to claim 13, wherein the cosmetic composition comprises a water-in-oil (W/O) type, oil-in-water (O/W) type, oil dispersed, water dispersed or solubilized composition.

15. The cosmetic product according to claim 13, which further comprises a carrier for supporting the cosmetic composition.

* * * * *